(12) United States Patent
Ahn et al.

(10) Patent No.: US 7,716,991 B2
(45) Date of Patent: May 18, 2010

(54) APPARATUS FOR MEASURING PRESSURE USING ACOUSTIC IMPEDANCE VARIATION

(75) Inventors: Bongyoung Ahn, Daejeon (KR); Seung Hyun Cho, Gyeonggi-do (KR); Seung Soo Hong, Daejeon (KR); Yong Hyeon Shin, Daejeon (KR); Kwang Hwa Chung, Daejeon (KR)

(73) Assignee: Korea Research Institute of Standards and Science (KR)

( * ) Notice: Subject to any disclaimer, the term of this patent is extended or adjusted under 35 U.S.C. 154(b) by 2 days.

(21) Appl. No.: 12/192,594

(22) Filed: Aug. 15, 2008

(65) Prior Publication Data

US 2009/0277275 A1    Nov. 12, 2009

(30) Foreign Application Priority Data

May 6, 2008   (KR) ................. 10-2008-0041715

(51) Int. Cl.
*G01L 11/00*   (2006.01)
(52) U.S. Cl. ..................................... 73/703
(58) Field of Classification Search ............. None
See application file for complete search history.

(56) References Cited

U.S. PATENT DOCUMENTS

| | | | | |
|---|---|---|---|---|
| 3,942,381 A * | 3/1976 | Brown et al. ............... 73/703 |
| 4,869,097 A * | 9/1989 | Tittmann et al. ............. 73/52 |
| 5,869,745 A * | 2/1999 | Schroeder et al. .......... 73/31.04 |
| 6,073,491 A * | 6/2000 | Fischer et al. ............... 73/629 |
| 6,393,920 B1 * | 5/2002 | Toda .......................... 73/721 |
| 6,461,301 B2 * | 10/2002 | Smith ........................ 600/438 |
| 6,568,281 B1 * | 5/2003 | Sato et al. ............... 73/861.27 |
| 6,931,930 B2 * | 8/2005 | Reck .......................... 73/597 |
| 2001/0037676 A1 * | 11/2001 | Chang ........................ 73/120 |
| 2003/0074970 A1 * | 4/2003 | Reck .......................... 73/629 |
| 2007/0183584 A1 * | 8/2007 | Baumann et al. ........... 378/145 |
| 2009/0314058 A1 * | 12/2009 | Cardelius .................. 73/24.01 |

FOREIGN PATENT DOCUMENTS

JP         58026238 A  *  2/1983
JP      2005300244 A  * 10/2005

* cited by examiner

*Primary Examiner*—Lisa M Caputo
*Assistant Examiner*—Jermaine Jenkins
(74) *Attorney, Agent, or Firm*—Momkus McCluskey, LLP; Jefferson Perkins; Steven Behnken (57) ABSTRACT

The present invention relates to an apparatus for measuring pressure inside a predetermined vessel based on the principle that the transmitting efficiency of ultrasonic waves is changed by acoustic impedance variation according to an internal pressure. The apparatus includes an ultrasound exciting unit 20 disposed inside the vessel 10 and generating predetermined ultrasonic waves, an ultrasound receiving unit 30 disposed inside the vessel 10 and placed on the same axis line as that of the ultrasound exciting unit 20, a control unit 70 for controlling a frequency and a waveform of the excitation signal transmitted into the ultrasound exciting unit 20, and a pressure measuring unit 80 for measuring an internal pressure of the vessel 10 based on an ultrasonic signal received by the ultrasound receiving unit 30 and the excitation signal transmitted into the ultrasound exciting unit 20.

8 Claims, 5 Drawing Sheets

APPARATUS FOR MEASURING PRESSURE USING ACOUSTIC IMPEDANCE VARIATION

BACKGROUND OF THE INVENTION

1. Field of the Invention

The present invention relates to an apparatus for measuring pressure inside a predetermined vessel based on the principle that the transmitting efficiency of ultrasonic waves is changed by acoustic impedance variation according to an internal pressure. The present invention provides a pressure measuring apparatus which can improve resolutions, increase a dynamic range, and measure pressure in a low or high vacuum state and even under atmospheric pressure or higher, including a high pressure, by disposing ultrasonic transducers and/or a reflection plate inside a vessel or inducing resonance.

2. Background of the Related Art

Technologies for measuring pressure inside a predetermined vessel are generally used to check the degree of vacuum inside the vessel in the semiconductor or display manufacturing process. Among various methods to measure pressure, a capacitance diaphragm gauge (CDG) is mostly used. The capacitance diaphragm gauge is based on the principle that the displacement of the diaphragm of the capacitance diaphragm gauge is changed by a variation in the internal pressure of a vessel, and hence capacitance is changed. In general, the capacitance diaphragm gauge is available only in a low vacuum region.

To measure pressure in a high vacuum region an ionization gauge is usually employed. The ionization gauge is based on the principle that, when pressure is changed, a probability that electrons may collide against gas molecules increases, and the number of generated positive ions changes when the electrons collide against the gas molecules. The ionization gauge can measure pressure in the range of high vacuum regions of $10^{-1}$ Pa to $10^{-10}$ Pa, but has a problem that linearity cannot be guaranteed below $10^{-6}$ Pa.

As for high pressure gauges, pressure in a limited small pressure chamber of various ultra-high pressure generators must be measured directly. An ultra-high pressure is generated by compressing a sample by application of a force to a sample compression device, such as a piston-cylinder type, using a hydraulic pressure device. Accordingly, an average pressure of the sample can be found by dividing the magnitude of applied force by a cross section of the sample chamber cross section. However, if this method is used, pressure distributions inside a gasket for sealing a sample are not constant, loss of a force due to friction is increased, and therefore pressure values are only approximately estimated.

As described above, there is a problem in that a pressure measuring apparatus in which an approximate degree of vacuum of a vessel is taken into consideration has to be selected and installed every time. Further, measurement methods are changed, resulting in inconvenience in use.

SUMMARY OF THE INVENTION

Accordingly, the present invention has been made in an effort to solve the above problems occurring in the prior art, and the present invention employs an ultrasound exciting unit and an ultrasound receiving unit, which are composed of ultrasonic transducers and disposed inside a vessel, and a reflection plate or/and resonance. It is therefore an object of the present invention to provide an apparatus, which can improve accuracy when measuring the degree of vacuum or pressure inside a vessel and can measure pressure in a low or high vacuum state and even under atmospheric pressure or higher, including a high pressure.

To accomplish the above object, in one aspect, the present invention provides a pressure measuring apparatus including an ultrasound exciting unit disposed inside the vessel and transmitting predetermined ultrasonic waves, an ultrasound receiving unit disposed inside the vessel and placed on the same axis line with that of the ultrasound exciting unit, a control unit for controlling a frequency and a waveform of the excitation signal transmitted into the ultrasound exciting unit, and a pressure measuring unit for measuring an internal pressure of the vessel based on an ultrasonic signal received by the ultrasound receiving unit and the excitation signal transmitted into the ultrasound exciting unit.

The ultrasound exciting unit and the ultrasound receiving unit include a piezoelectric ultrasonic transducer, an electrostrictive ultrasonic transducer, a magnetostrictive ultrasonic transducer or an electromagnetic ultrasonic transducer.

The control unit can control the ultrasound exciting unit so that the ultrasonic waves generated from the ultrasound exciting unit are resonated between the ultrasound exciting unit and the ultrasound receiving unit.

In another aspect, the present invention provides a pressure measuring apparatus including an ultrasound exciting/receiving unit disposed within one side of the vessel 10 for outputting predetermined ultrasonic waves to an inside of the vessel and receiving ultrasonic waves reflected at inner wall of the vessel, a control unit connected to the ultrasound exciting/receiving unit for controlling a frequency and a waveform of the excitation signal transmitted into the ultrasound exciting/receiving unit, and a pressure measuring unit for measuring an internal pressure of the vessel 10 based on the ultrasonic signal received by the ultrasound exciting/receiving unit and the excitation signal transmitted into the ultrasound exciting/receiving unit.

A reflection plate for reflecting the ultrasonic waves generated from the ultrasound exciting/receiving unit is further included inside the vessel.

The ultrasound exciting/receiving unit can be a piezoelectric ultrasonic transducer, an electrostrictive ultrasonic transducer, a magnetostrictive ultrasonic transducer or an electromagnetic ultrasonic transducer.

The control unit can control the ultrasound exciting/receiving unit so that the ultrasonic waves output from the ultrasound exciting/receiving unit are resonated between the ultrasound exciting/receiving unit and an inner wall of the vessel or between the ultrasound exciting/receiving unit and the reflection plate.

BRIEF DESCRIPTION OF THE DRAWINGS

Further objects and advantages of the invention can be more fully understood from the following detailed description taken in conjunction with the accompanying drawings in which.

<EXPLANATION ON REFERENCE NUMERALS OF PRINCIPAL ELEMENTS IN THE DRAWINGS>

10: vessel 20: the ultrasound exciting unit
30: ultrasound receiving unit
40: ultrasound exciting/receiving unit
70: control unit 80: pressure measuring unit
90: vacuum pump 92: valve
100: reflection plate

DETAILED DESCRIPTION OF THE PREFERRED EMBODIMENT

Figure 1:
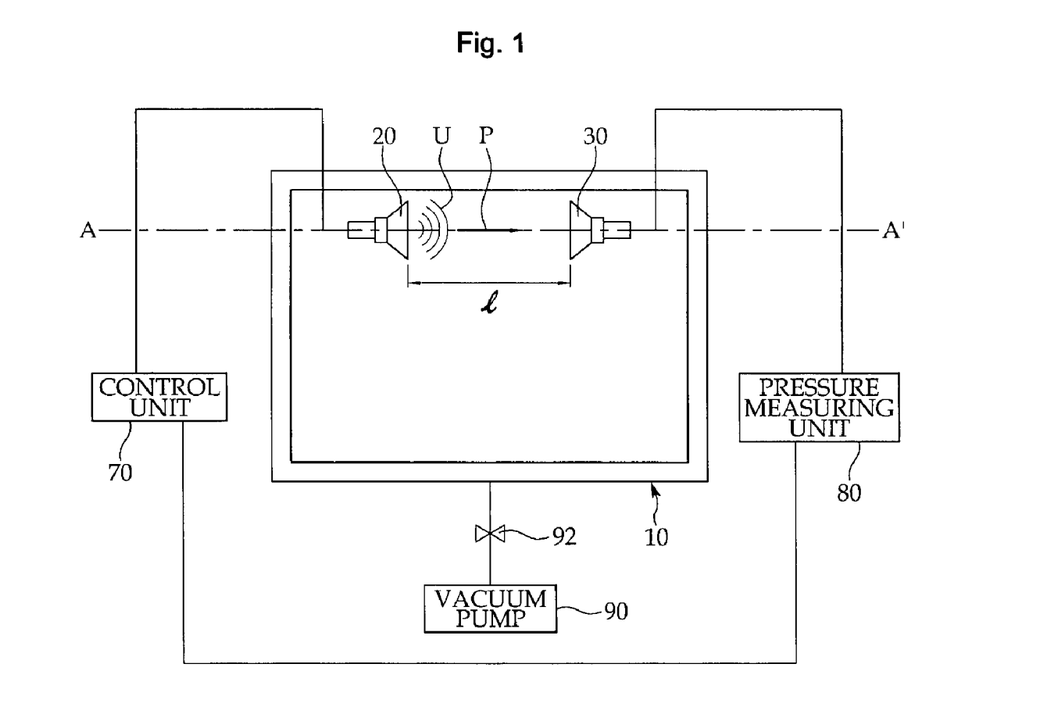
FIG. 1 is a diagram showing a state where an apparatus for measuring pressure using acoustic impedance variation in accordance with a first embodiment of the present invention is installed.
Figure 2:
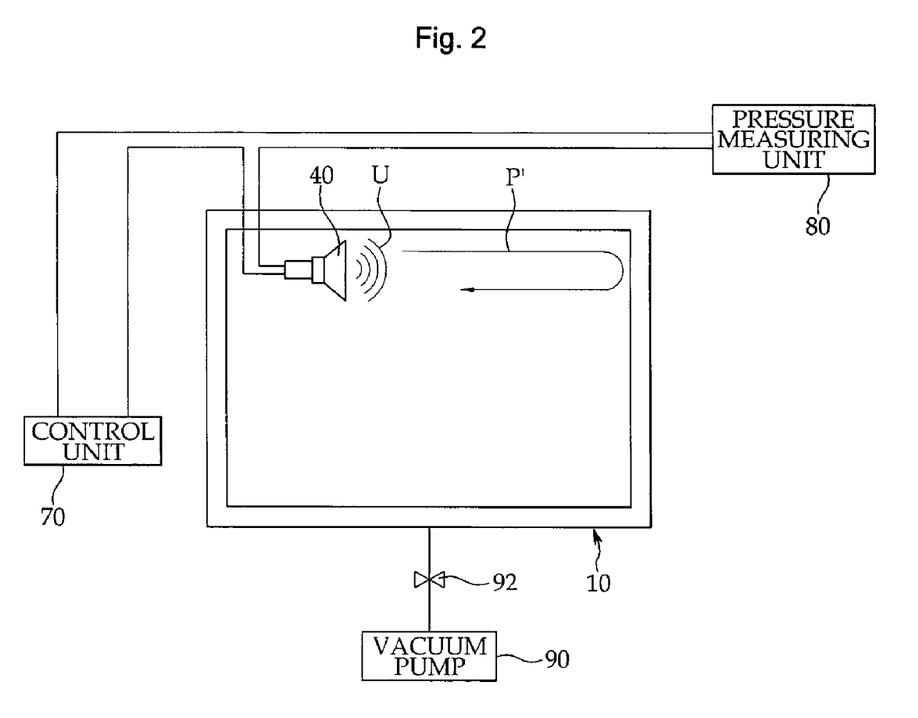
FIG. 2 is a diagram showing a state where an apparatus for measuring pressure using acoustic impedance variation in accordance with a second embodiment of the present invention is installed.
Figure 3:
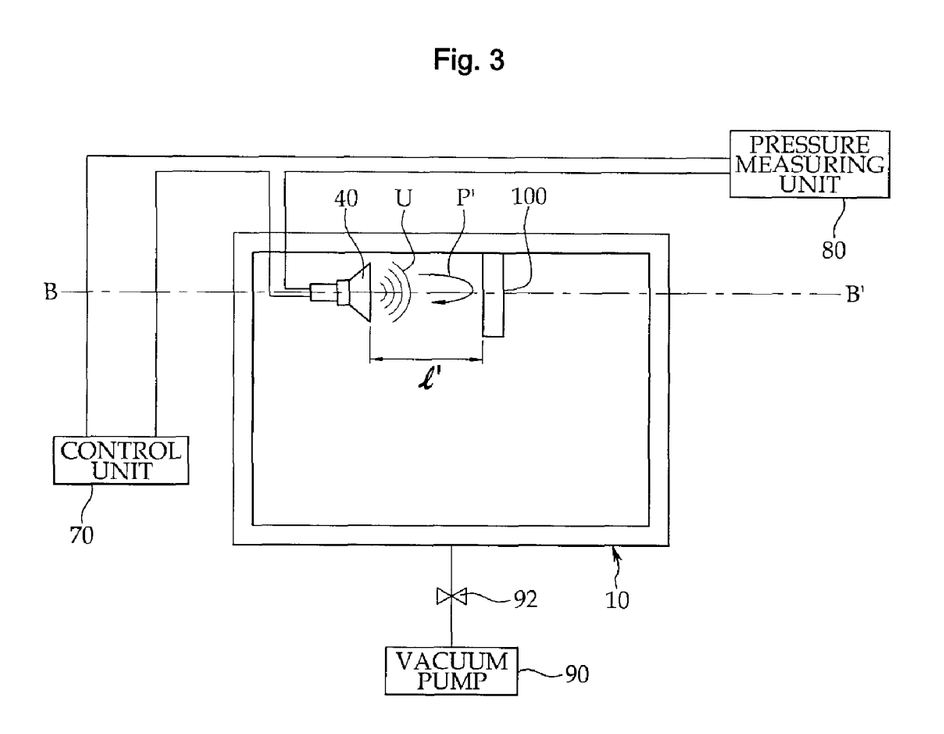
FIG. 3 is a diagram showing a state where an apparatus for measuring pressure using acoustic impedance variation in accordance with a third embodiment of the present invention is installed.

The present invention will now be described in detail in connection with specific embodiments with reference to the accompanying drawings. In FIGS. 1 to 3, reference numeral U denotes ultrasonic waves traveling inside a vessel 10, and reference numerals P and P' denote travel paths of the ultrasonic waves U inside the vessel 10.

<Construction of Pressure Measuring Apparatus>

First Embodiment

An apparatus for measuring pressure using acoustic impedance variation in accordance with the present invention includes, as shown in FIG. 1, an the ultrasound exciting unit 20 for generating ultrasonic waves to the inside of the vessel 10, an ultrasound receiving unit 30 for receiving the ultrasonic waves traveling in the inside of the vessel 10, a control unit 70 for controlling the frequency and waveform of the excitation signal transmitted into the ultrasound exciting unit 20, and a pressure measuring unit 80 for measuring the pressure of gas inside the vessel 10 based on a signal of the ultrasonic wave signal received by the ultrasound receiving unit 30.

The vessel 10 has a predetermined volume therein and has a material and thickness, which can stand against a difference between an internal pressure and an external atmospheric pressure. The material of the vessel 10 is selected in consideration of rigidity, corrosion prevention, and so on.

The ultrasound exciting unit 20 and the ultrasound receiving unit 30 are disposed inside the vessel 10. The ultrasound exciting unit 20 is configured to generate ultrasonic waves to the inside of the vessel 10, and can include an ultrasonic transducer comprised of a piezoelectric vibrator (hereinafter referred to as a 'piezoelectric ultrasonic transducer'), an ultrasonic transducer comprised of an electrostrictive vibrator (hereinafter referred to as an 'electrostrictive ultrasonic transducer'), an ultrasonic transducer comprised of a magnetostrictive acoustic oscillator (hereinafter referred to as a 'magnetostrictive ultrasonic transducer'), an ultrasonic transducer comprised of an electromagnetic vibrator (hereinafter referred to as an 'electromagnetic ultrasonic transducer') or the like.

The piezoelectric ultrasonic transducer is configured to change electric field to mechanical deformation and thus generate ultrasonic waves, when a oscillating electric voltage is applied to a crystalline structure such as crystal, Rochell salt or ammonium dihydrogen phosphate (ADP), and can be used even in solid, liquid and gas media.

The electrostrictive ultrasonic transducer employs a polarization phenomenon, which is generated when an electric field is applied to dielectric material such as barium titanate ($BaTiO_3$), and is mainly useful for liquid media. The magnetostrictive ultrasonic transducer employs a phenomenon in which, when a magnetic field is applied to ferromagnetic material, such as nickel, Terfenol-D or iron-cobalt alloy, the ferromagnetic material is magnetized, ultrasonic waves are generated by the deformation of the ferromagnetic material, and is useful in solid, liquid, and gas media.

The electromagnetic ultrasonic transducer uses a voice coil type vibrator, such as a dynamic speaker, and is configured to vibrate surrounding median using an AC oscillator of a high frequency.

The ultrasonic waves generated from the ultrasound exciting unit 20 are controlled to have a predetermined amplitude, frequency, waveform, etc. under the control of the control unit 70.

The ultrasound receiving unit 30 functions to receive an ultrasonic waves traveling inside the vessel 10. The amplitude, waveform, etc. of the ultrasonic waves traveling inside the vessel 10 are changed because of a change in acoustic impedance according to the pressure of gas filling in the vessel 10. The ultrasound receiving unit 30 can also use the piezoelectric ultrasonic transducer, the electrostrictive ultrasonic transducer, the magnetostrictive ultrasonic transducer, the electromagnetic ultrasonic transducer or the like in the same manner as the ultrasound exciting unit 20. Further, the ultrasound receiving unit 30 is preferably placed on the same axis line (A-A') as that of the ultrasound exciting unit 20.

The control unit 70 is a device functioning to control the ultrasound exciting unit 20. In the present invention, preferably, the transmitting efficiency of ultrasound can be increased by inducing resonance of ultrasonic waves. The control unit 70 applies a excitation signal to the ultrasound exciting unit 20 such that the ultrasound exciting unit 20 generates ultrasonic waves, having a predetermined frequency and signal waveform, and therefore the ultrasonic waves are resonated between the ultrasound excitation unit 20 and the ultrasound receiving unit 30.

The pressure measuring unit 80 measures pressure inside the vessel 10 based on an ultrasonic signal received by the ultrasound receiving unit 30 and the excitation signal transmitted into the ultrasound exciting unit 20. Acoustic impedance of the vessel 10 varies according to the density of gas molecules, that is, pressure inside the vessel 10. In the case in which the inside of the vessel 10 is in a high vacuum state, acoustic impedance of a gas has a relatively small value since media, which can transmit the ultrasonic waves, is rare. However, in the case in which pressure inside the vessel 10 is high, acoustic impedance has a relatively great value. The higher is the internal pressure of the vessel 10, the higher is the transmitting efficiency of ultrasonic waves to the ultrasound receiving unit 30. Accordingly, the amplitude (intensity) of received ultrasonic waves is increased. Based on this relationship, an internal pressure of the vessel 10 can be measured in consideration of the intensity of the ultrasonic waves propagating inside the vessel 10, an arrival time of the ultrasonic waves inside the vessel 10, and so on.

Preferably, a distance 'l' between the ultrasound exciting unit 20 and the ultrasound receiving unit 30 is set to meet the resonance condition of ultrasonic waves. This is because the transmitting efficiency of the ultrasound receiving unit 30 can be increased by inducing resonance. In inducing such resonance, the control unit 70 can control the frequency and waveform of the excitation signal transmitting into the ultrasound exciting unit 20 so as to induce resonance of the ultrasonic waves between the ultrasound exciting unit 20 and the ultrasound receiving unit 30. This resonance is useful when high intensity ultrasound is required in order to measure a high vacuum.

Further, a filter unit (not shown) is for removing various noises included in measured ultrasonic wave signals. The filter unit can be preferably added before a signal of ultrasonic waves U', received by the ultrasound receiving unit 30, is applied to the pressure measuring unit 60. For example, the filter unit may employ a highpass filter (HPF) or a bandpass filter (BPF).

Second Embodiment

A pressure measuring apparatus in accordance with another embodiment of the present invention includes, as shown in FIG. 2, an ultrasound exciting/receiving unit 40, a control unit 70 connected to the ultrasound exciting/receiving unit 40 and controlling ultrasonic waves transmitting into the inside of a vessel 10, and a pressure measuring unit 80 for measuring an internal pressure of the vessel 10 based on an ultrasonic signal received by the ultrasound exciting/receiving unit 40.

The ultrasound exciting/receiving unit 40 is disposed inside the vessel 10. The ultrasound exciting/receiving unit 40 is one device serving as the ultrasound exciting unit 20 and the ultrasound receiving unit 30 of the above first embodiment as described above, and can employ the piezoelectric ultrasonic transducer, the electrostrictive ultrasonic transducer, the magnetostrictive ultrasonic transducer, the electromagnetic ultrasonic transducer or the like. The ultrasonic waves, generated from the ultrasound exciting/receiving unit 40 to the inside of the vessel 10, travel inside the vessel 10. The traveling ultrasonic waves are reflected from an inner wall of the vessel 10 and then return back to the ultrasound exciting/receiving unit 40 according to a pulse-echo method.

The control unit 70 applies a predetermined control signal into the ultrasound exciting/receiving unit 40 and decides the amplitude, frequency, waveform, etc. of the excitation signal transmitting into the ultrasound exciting/receiving unit 40. Since resonance is preferably employed in the present invention, the control unit 70 applies a controlled signal to the ultrasound exciting/receiving unit 40 such that the ultrasonic waves are resonated between the ultrasound exciting/receiving unit 40 and the inner wall of the vessel 10. The constructions and characteristics of the pressure measuring unit 80 and a filter unit (not shown) are identical to those of the first embodiment and detailed description thereof is omitted.

Third Embodiment

FIG. 3 is a diagram showing a state where an apparatus for measuring pressure using acoustic impedance variation in accordance with a third embodiment of the present invention is installed. The apparatus of FIG. 3 further includes a reflection plate 100 in the construction of the second embodiment. In the case in which a signal of ultrasonic waves is received according to the pulse-echo method in the same manner as the second embodiment, the reflection plate 100 is further disposed close to the ultrasound exciting/receiving unit 40 so as to reduce the attenuation of ultrasonic waves propagating inside the vessel 10. Moreover, the reflection plate 100 is preferably disposed on the same axis line (B-B') as that of the ultrasound exciting/receiving unit 40.

A distance l' between the ultrasound exciting/receiving unit 40 and the reflection plate 100 can be set in consideration of resonance of ultrasonic waves traveling inside the vessel 10. The reflection plate 100 can be made of any material that is able to reflect ultrasonic waves.

Further, unexplained reference numeral 90 denotes a vacuum pump for making the inside of the vessel in a vacuum state, and unexplained reference numeral 92 denotes a valve used to produce vacuum. The above auxiliary devices are for making the inside of the vessel 10 in a vacuum state and are not indispensable constituent elements of the pressure measuring apparatus of the present invention.

<Pressure Measuring Method>

The present invention employs a characteristic in which the transmitting efficiency of ultrasonic waves is changed according to acoustic impedance variation according to pressure. Hereinafter, a method of measuring an internal pressure of the vessel 10 is described per on an embodiment basis.

Method of First Embodiment

First, the pressure measuring apparatus is first installed (S10), as shown in FIG. 1. The ultrasound exciting unit 20 and the ultrasound receiving unit 30 are disposed inside the vessel 10, and the control unit 70 and the pressure measuring unit 80 are disposed outside the vessel 10.

The ultrasound exciting unit 20 generates ultrasonic waves, having a predetermined amplitude, frequency, waveform, etc., into the inside of the vessel 10 through the control of current, voltage, etc. of the excitation signal by the control unit 70 (S20). In order to induce resonance of the ultrasonic waves between the ultrasound exciting unit 20 and the ultrasound receiving unit 30, the control unit 70 can also control the frequency, etc. of the excitation signal transmitting into the ultrasound exciting unit 20 as well as that the installation distance l between the ultrasound exciting unit 20 and the ultrasound receiving unit 30 is taken into consideration when the pressure measuring apparatus is installed (S10).

The ultrasonic waves transmitting into the inside of the vessel 10 travel inside the vessel 10 and are received by the ultrasound receiving unit 30 (S30). The characteristics, frequency, amplitude, and so on of the ultrasonic waves, which propagate inside the vessel 10, a time of flight of the ultrasonic waves inside the vessel 10, and so on vary according to the density of gas filling in the vessel 10, that is, the degree of pressure.

The received signal of the ultrasonic waves is transmitted to the pressure measuring unit 80. The pressure measuring unit 80 measures an internal pressure of the vessel 10 based on a signal of the ultrasonic waves received by the ultrasound receiving unit 30 and a excitation signal transmitted into the inside of the vessel 10 (S40).

Figure 4:
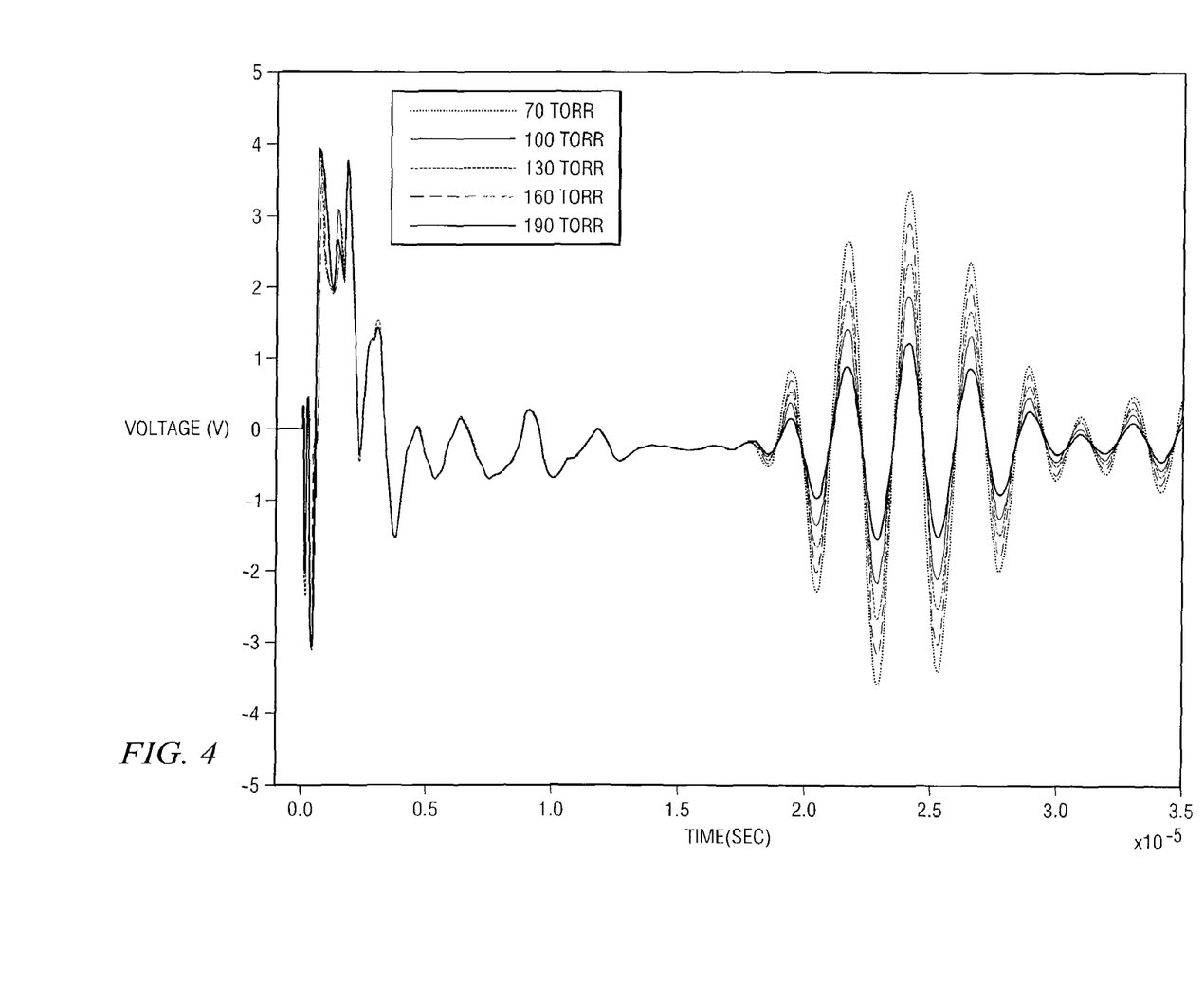
FIG. 4 is a graph showing a measured ultrasonic signal by an ultrasound receiving unit in FIG. 1.

FIG. 4 is a graph showing that, in the case in which ultrasonic waves are excited and generated from the ultrasound exciting unit 20, the measured ultrasonic signals received by the ultrasound receiving unit 30 are represented by voltage (V). An x axis indicates the time, and a y axis indicates voltage values received by the ultrasound receiving unit 30. In the graph, the measured pulses in the time domains of 0 to about $1.5 \times 10^{-5}$ seconds are electrically induced crosstalk signals and have no relation to internal pressure of the vessel 10. Accordingly, as shown in FIG. 4, the crosstalk signals are constant although the internal pressures of the vessel 10 are changed. The measured signals in the time domains of about $1.8 \times 10^{-5}$ to $3 \times 10^{-5}$ seconds are values, indicating ultrasonic signals that have first arrived at the ultrasound receiving unit 30.

It can be seen that the measured signals in the time domains of about $1.8 \times 10^{-5}$ to $3 \times 10^{-5}$ seconds differ according to the internal pressures of the vessel 10, as shown in FIG. 4. The internal pressures of the vessel 10 are measured on the basis of the magnitude of the measured signals in the y axis, which is performed by the pressure measuring unit 80.

Figure 5:
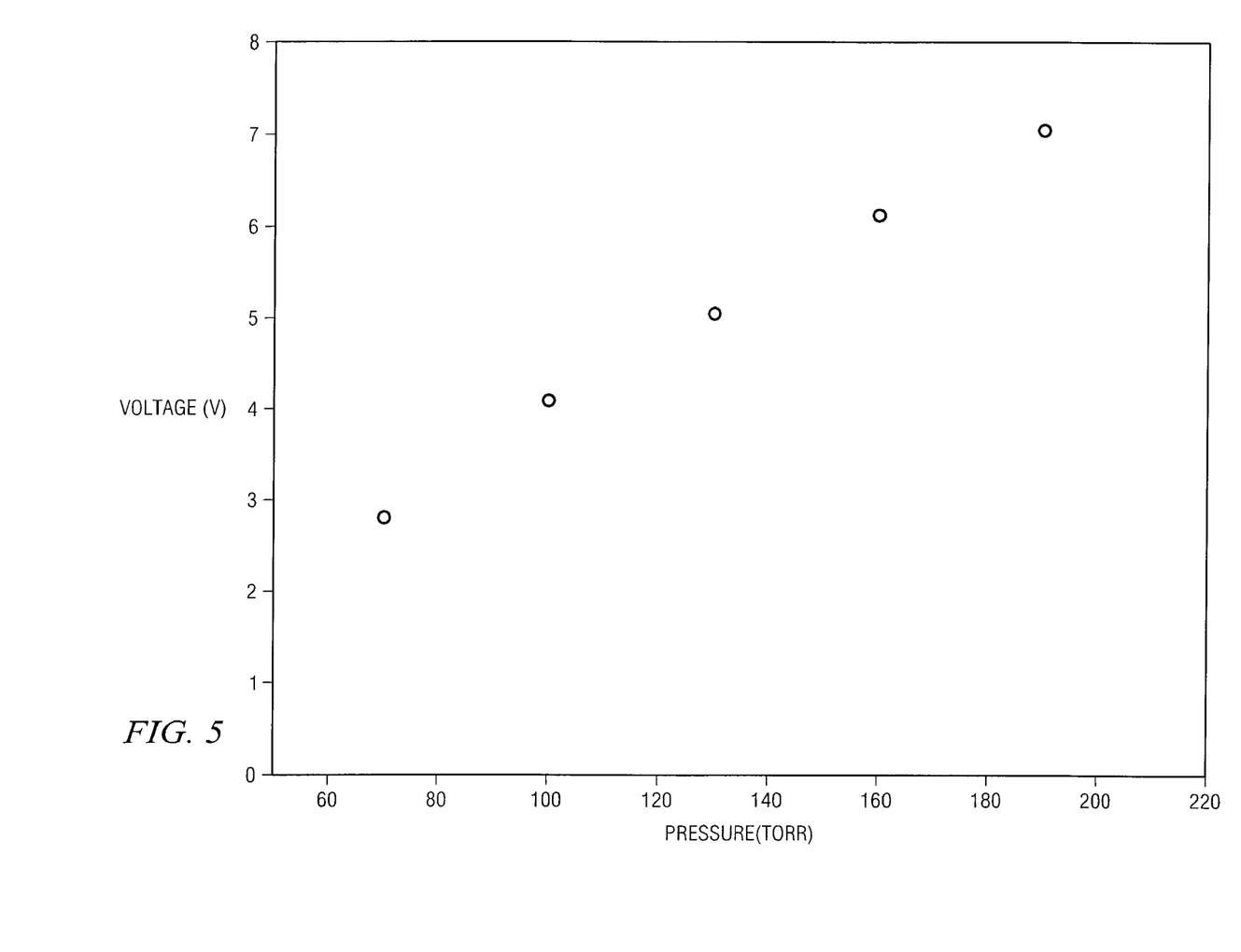
FIG. 5 is a graph showing the relationship between the pressure and the peak-to-peak voltage values in the time domains ranging from $2.1 \times 10^{-5}$ seconds to $2.4 \times 10^{-5}$ seconds in FIG. 4.

FIG. 5 is a graph showing the relationship between pressures and peak-to-peak magnitude values of the measured ultrasonic waves in the time domains of about $2.1 \times 10^{-5}$ to $2.4 \times 10^{-5}$ seconds, in the graph of FIG. 4. An x axis indicates the pressure (unit: Torr), and a y axis indicates voltage (unit: V). From FIG. 5, it can be seen that, as the internal pressure of the vessel 10 increases, the magnitude of ultrasonic signals (measured as the voltage values) received by the ultrasound receiving unit 30 are increased.

Method of Second Embodiment

In a pressure measuring method using the pressure measuring apparatus in accordance with the second embodiment of the present invention, a step (S10) of installing the pressure measuring apparatus, and a step (S20) in which the ultrasound exciting/receiving unit 40 generates ultrasonic waves based on the excitation signal of the control unit 70 are identical to those of the method according to the first embodiment.

The ultrasonic waves generated from the ultrasound exciting/receiving unit 40 propagate inside the vessel 10. The traveling ultrasonic waves are reflected from the inner wall of the vessel 10 and then return back to the ultrasound exciting/receiving unit 40. The amplitude, waveform, etc. of the measured ultrasonic wave signal received by the ultrasound receiving unit 40 are changed according to the pressure of an internal gas of the vessel 10. Further, the amplitude, waveform, and/or the like of the ultrasonic signal are changed by the reflectance of the inner wall of the vessel 10. The ultrasonic signal is received by the ultrasound exciting/receiving unit 40 (S30').

The pressure measuring unit 80 measures an internal pressure of the vessel 10 based on based on a signal of the ultrasonic waves received by the ultrasound exciting/receiving unit 40 and a excitation signal transmitted into the ultrasound exciting/receiving unit 40 (S40)

Method of Third Embodiment

A pressure measuring method using the pressure measuring apparatus in accordance with the third embodiment of the present invention is identical to the method of measuring an internal pressure of the vessel 10 using the pressure measuring apparatus according to the second embodiment. However, in this embodiment, the reflection plate 100 for reflecting ultrasonic waves generated from the ultrasound exciting/receiving unit 40, is further included such that the ultrasonic waves are reflected from not the inner wall of the vessel 10, but the reflection plate 100. Therefore, an ultrasonic signal received by the ultrasound exciting/receiving unit 40 in the method of the third embodiment differs from that received in the method of the second embodiment. The distance between the ultrasound exciting/receiving unit 40 and the reflection plate 100 in the present embodiment is shorter than that between the ultrasound exciting/receiving unit 40 and the inner wall of the vessel 10 in the second embodiment. Accordingly, much attenuation of ultrasonic wave can be prevented and therefore the transmitting efficiency can be increased (S30''').

A step (S10) of installing the pressure measuring apparatus, a step (S20) of generating ultrasonic waves, and steps (S40, S40') of measuring based on ultrasonic waves generating into the inside of the vessel 10 and a received ultrasonic signal are identical to those of the above first and second embodiments, and description thereof is omitted.

MODIFICATION EXAMPLE

In the case in which ultrasonic waves traveling inside the vessel 10 resonates between the ultrasound exciting unit 20 and the ultrasound receiving unit 30 and between the ultrasound exciting/receiving unit 40 and the reflection plate 100 or the inner wall of the vessel 10, the magnitude of transmitted ultrasonic waves is increased, so that the transmitting efficiency of the ultrasonic waves is improved. What the transmitting efficiency of the ultrasound increases means that the accuracy or resolution can be improved in measuring an internal pressure of the vessel 10. The excitation signal transmitted into the ultrasound exciting unit 20 or the ultrasound exciting/receiving unit 40 is controlled by the control unit 70 so that resonance of the ultrasonic waves is induced.

According to the present invention, the pressure of gas inside the vessel 10 is measured and, therefore, the pressure of any kind of gas can be measured. The present invention can be applied to a case where the vessel 10 is in a vacuum state since it is preferably used for the semiconductor or display manufacturing process, but not limited thereto.

The present invention can also be applied to a case where the inside of the vessel 10 is filled with solid or liquid not gas.

The pressure measuring apparatus and method of the present invention, which are based on the principle that the transmitting efficiency of ultrasonic waves is changed according to acoustic impedance variation according to an internal pressure, are advantageous in that resolutions are improved since the ultrasonic transducer and/or the reflection plate are/is disposed inside a vessel or resonance is induced. Further, the pressure measuring apparatus and method of the present invention are advantageous in that pressure can be measured in a low or high vacuum state and even under atmospheric pressure or higher, including a high pressure, since a dynamic range is great.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An apparatus for measuring pressure of a gas inside a pressure vessel using ultrasonic waves based on acoustic impedance variation of gas, the apparatus comprising:
   an ultrasound exciting unit disposed inside the pressure vessel and generating predetermined ultrasonic waves;
   an ultrasound receiving unit disposed inside the pressure vessel and placed on the same axis line as that of the ultrasound exciting unit;
   a control unit for controlling a frequency and a waveform of the excitation signal transmitted into the ultrasound exciting unit; and
   a pressure measuring unit for measuring an internal pressure of the gas in the pressure vessel based on the amplitude of the ultrasonic signal received by the ultrasound receiving unit.

2. The apparatus as claimed in claim 1, wherein the ultrasound exciting unit and the ultrasound receiving unit comprise a piezoelectric ultrasonic transducer, an electrostrictive ultrasonic transducer, a magnetostrictive ultrasonic transducer or an electromagnetic ultrasonic transducer.

3. The apparatus as claimed in claim 1, wherein the control unit controls excitation signal transmitted into the ultrasound exciting unit so that the ultrasonic waves generated from the ultrasound exciting unit are resonated between the ultrasound exciting unit and the ultrasound receiving unit.

4. An apparatus for measuring pressure of a gas inside a pressure vessel using ultrasonic waves based on acoustic impedance variation of the gas, the apparatus comprising:
- an ultrasound exciting/receiving unit disposed inside one side of the pressure vessel for generating predetermined ultrasonic waves toward a wall of the pressure vessel and receiving ultrasonic waves reflected from the wall and traveling inside the pressure vessel;
- a control unit connected to the ultrasound exciting/receiving unit for controlling a frequency and a waveform of the excitation signal transmitted into the ultrasound exciting/receiving unit; and
- a pressure measuring unit for measuring an internal pressure of the gas in the pressure vessel based on the amplitude of the ultrasonic signal received by the ultrasound exciting/receiving unit and the excitation signal transmitted into the inside of the pressure vessel.

5. The apparatus as claimed in claim 4, wherein a reflection plate for reflecting the ultrasonic waves generated from the ultrasound exciting/receiving unit is further included inside the vessel.

6. The apparatus as claimed in claim 4, wherein the ultrasound exciting/receiving unit comprises a piezoelectric ultrasonic transducer, an electrostrictive ultrasonic transducer, a magnetostrictive ultrasonic transducer or an electromagnetic ultrasonic transducer.

7. The apparatus as claimed in claim 4, wherein the control unit controls the excitation signal transmitted into the ultrasound exciting/receiving unit so that the ultrasonic waves generated from the ultrasound exciting/receiving unit are resonated between the ultrasound exciting/receiving unit and an inner wall of the vessel.

8. The apparatus as claimed in claim 5, wherein the control unit controls the excitation signal transmitted into the ultrasound exciting/receiving unit so that the ultrasonic waves generated from the ultrasound exciting/receiving unit are resonated between the ultrasound exciting/receiving unit and the reflection plate.

* * * * *